UNITED STATES PATENT OFFICE.

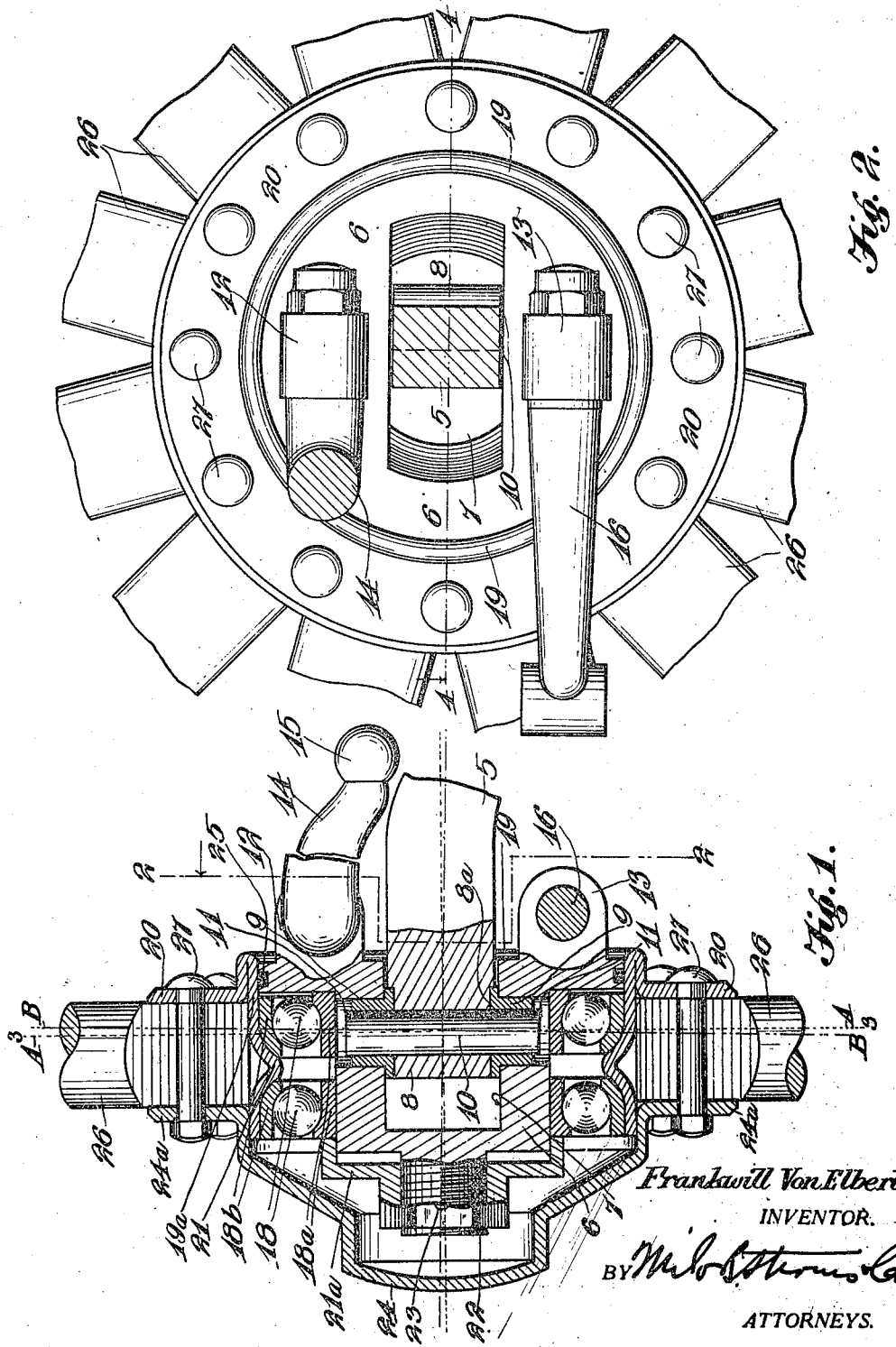

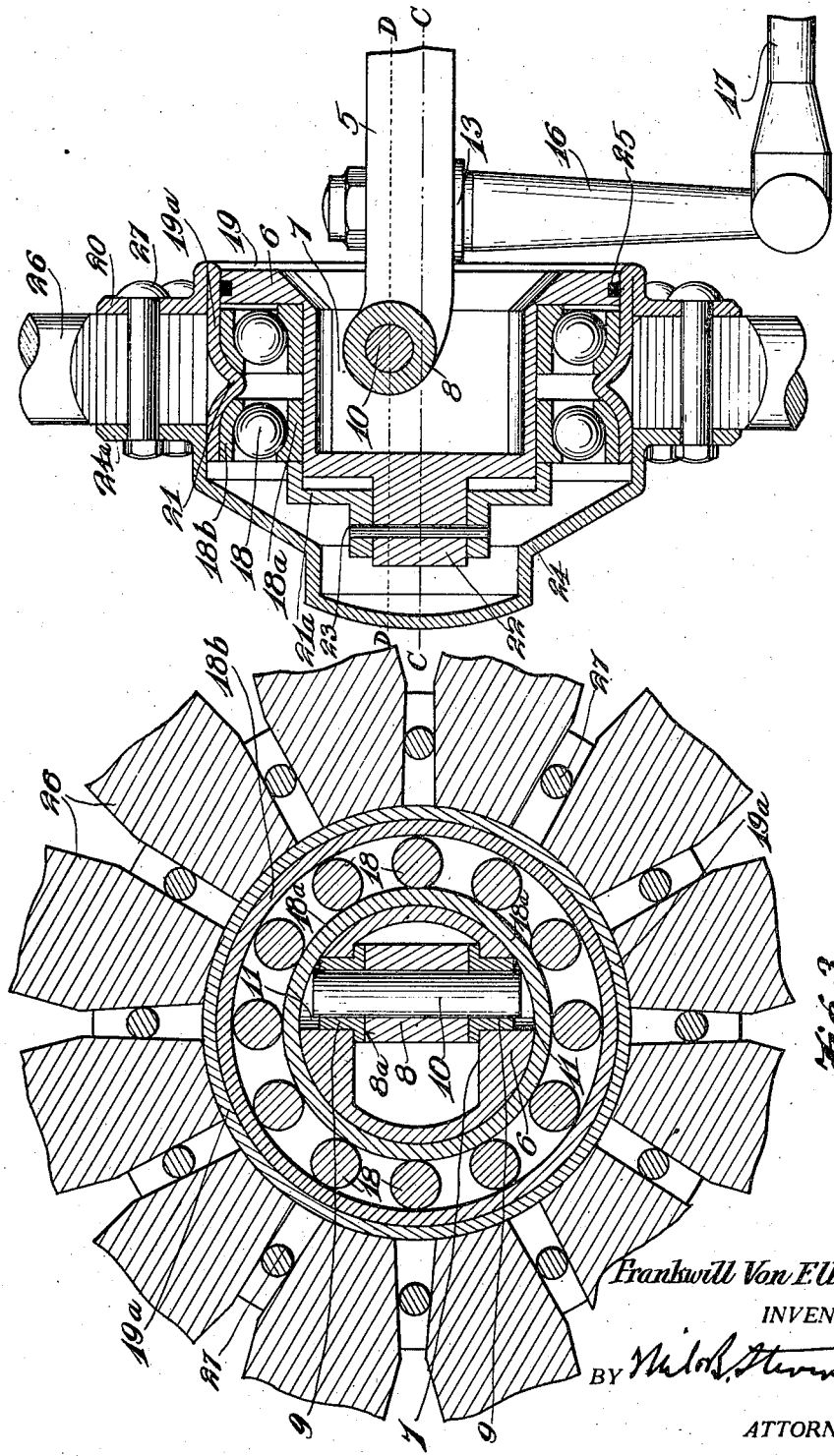

FRANKWILL VON ELBERTZ, OF CHICAGO, ILLINOIS, ASSIGNOR OF ONE-HALF TO HENRY H. BUCKWALTER, OF CHICAGO, ILLINOIS, AND ONE-HALF TO HENRY S. PRUYN, JR., OF COOK COUNTY, ILLINOIS.

STEERING-WHEEL.

1,242,279.     Specification of Letters Patent.     Patented Oct. 9, 1917.

Application filed November 4, 1915. Serial No. 59,536.

*To all whom it may concern:*

Be it known that I, FRANKWILL VON ELBERTZ, a citizen of the United States, residing at Chicago, in the county of Cook and State of Illinois, have invented new and useful Improvements in Steering - Wheels, of which the following is a specification.

This invention relates to the steering wheels of motor cars, and more particularly the structure and mounting of the wheel hub and the pivotal connection between the steering axle and the stub axle which carries the wheel.

The present invention has for its object to provide a hub structure of novel and improved form as will be pointed out and claimed hereinafter, and, furthermore, to provide a pivotal connection between the steering axle and the stub axle which will give the wheel a caster action, thereby preventing or minimizing the tendency of the car to skid or overturn in case the steering connection should be broken.

The invention also has for its object to provide a pivotal connection between the steering axle and the stub axle which gives the wheel an inward tilt at the bottom, and thereby counteracts the tendency of the wheels to spread.

With the objects stated above in view, the invention consists in a combination and arrangement of parts to be hereinafter described and claimed, and in order that the same may be better understood, reference is had to the accompanying drawings, in which—

Figure 1 is a vertical section of the hub portion of the wheel and the parts associated therewith;

Fig. 2 is a cross-section on the line 2—2 of Fig. 1;

Fig. 3 is a cross-section on the line 3—3 of Fig. 1, and

Fig. 4 is a horizontal section on the line 4—4 of Fig. 2.

Referring specifically to the drawings, 5 denotes one end of the front or steering axle, said end terminating in a knuckle 8 through which passes the pivot pin 10 whereby the connection with a stub axle 6 is made. The construction at the other end of the axle 5 is, of course, the same. The inner end of the stub axle 6 has a horizontal recess 7 to accommodate the knuckle 8, the width of the recess being sufficient to allow the stub axle to swing sidewise, the pivot pin 10 being vertical. The knuckle 8 is slightly reduced at the top and bottom, as indicated at 8ª, to take sleeves 9. The pivot pin 10 projects at both ends from the knuckle and has its projecting ends seating in the sleeves 9. The stub axle 6 has alined bearing apertures 11 in which the sleeves 9 are journaled, these apertures being in the top and bottom walls of the recess 7.

The stub axle 6 has two projecting ears 12 and 13, respectively, at its inner end, the same being in vertical alinement and on opposite sides, or above and below the axle 5. The ear 12 is provided for connection of the usual steering arm 14, the latter having a ball connection 15 with the steering gear link (not shown), as is the usual practice. The ear 13 takes an arm 16 to which is connected the cross rod 17 making connection with the stub action on the other end of the axle 5, and usually located to the rear of the latter.

The stub axle 6 is encircled by a double ball bearing 18, the races of which are made in two concentric sections, the inner section 18ª encircling the periphery of the stub axle, and the outer section 18ᵇ seating in the hub of the wheel which is mounted on the stub axle.

The hub of the wheel comprises an outer member 24 and an inner member 19. The two hub members have marginal flanges between which the spokes 26 of the wheel are clamped and secured by cross bolts 27. The flange of the outer member is shown at 24ª and the flange of the inner member at 20.

The inner hub member 19 has an inturned annular flange 19ª which encircles the stub axle 6 in spaced relation and in which seats the outer section 18ᵇ of the ball races of the bearing 18. The flange has a ridge 21 which spaces the ball races 18ᵇ. A cap nut 21ª is provided for adjusting the ball races, said nut being screwed on a reduced threaded portion 22 of the stub axle 6 at the outer end thereof. A cross pin 23 is passed through the parts 21ª and 22 to secure the same after the adjustment has been made. The outer hub member 24 is shaped to form a cap which closes over the outer end of the stub axle 6 and the parts carried thereby. In assembling the hub the outer section 18ᵇ of the ball bearing is applied before the hub member 24 is attached, and after applying the inner section 18ª, the inner member 19 of the hub, with the two ball bearings positioned therein, is slipped on the stub axle 6. The nut 21ª is then applied, after which the outer hub member is put on and fastened by the bolts 27. A reversal of this operation permits removal of the hub from the stub axle.

A felt packing ring 25 is inserted between the stub axle 6 and the hub member 19 to exclude dust, the stub axle having an encircling groove in which the packing ring seats.

The pivotal connection 10 between the axle 5 and the stub axle 6 is inside the plane of the wheel, and the pivot pin is not perfectly vertical, but is inclined slightly, or positioned at an angle to the vertical. This is clearly shown in Fig. 1 in which the dotted line A—A denotes the axis of the pin and the dotted line B—B denotes the actual vertical center. Thus, the wheel is tipped slightly inward at the bottom or cambered. The pivot pin 10 is also set slightly in advance of the center of the stub axle and the wheel, as shown in Figs. 3 and 4. In Fig. 4 the center line of the stub axle and the hub is shown at C—C, and the center line of the pivot pin at D—D.

The location of the pivot pin 10 ahead of the center line of the wheel gives the latter a caster effect, the pin acting as the stem of the caster, and this prevents skidding or overturning of the car in case of a broken steering connection. The camber of the wheel counteracts any spreading tendency of the wheels at the bottom and also reduces the liability of skidding. The pivot pin may be given any angle to obtain the best results.

The structure is also simple, strong and durable. The hub member 19 serves also as a ball-race retainer and is simple and economical to manufacture. The stub axle 6 can also be cheaply manufactured on account of the uniform diameter of the part on which the ball bearing is mounted. The two large ball bearings in the wheel are a decided advantage over one small bearing and one large bearing, one or both off the center, as is the design in many hubs. The large double row of bearings can carry more weight, forms a more compact structure, and is less liable to wear and displacement.

The length and size of the threaded stem 22 renders possible a wide range of adjustment and makes a stronger structure. The pin 23 and the nut 21ª may be secured as shown and described, or the nut may have its outer face grooved to hold the pin, as is the more modern practice.

As noted in Fig. 1, the axis A—A of the pin 10 is parallel to the plane of the spokes 26. This indicates that the angle of the pin corresponds to that given to the wheel. In addition to the angular adjustment of the pin when the wheel is tipped to the desired angle, sound engineering practice deems it essential that a vertical line passing through a point which is the exact center of the pin or steering pivot meet the ground on the tread line of the wheel; that is, the line which the bottom of the tire continually meets as the wheel rolls. Therefore, in order that the pin may meet this requirement, it should be shifted inward or outward on the line of the axle 5 and then tilted to correspond to the cambering angle of the wheel. It will be evident that, with the pin thus positioned, greater stability of the wheel will be the result.

The length of the pin is such that its ends abut the inner-bearing section 18ª, as clearly shown in Fig. 3. This prevents endwise movement of the pin in case it should weaken or crack, the parts affected thus holding together until facilities for the replacement of the pin are reached.

While the preferred embodiment of the invention has been shown and illustrated, it will be evident that various changes and modifications may be made without a departure from the spirit and scope of the invention as claimed hereinafter.

I claim:

The combination of a main axle having a knuckle at its end, a stub axle having a recess in its inner face in which the aforesaid knuckle seats, said knuckle having reduced top and bottom portions, axially alined sleeves mounted on said reduced portions, a pivot pin passing through the knuckle and the sleeves, the stub axle having alined off-center bearing-apertures in the top and bottom walls of the recess, in which apertures the sleeves seat, an anti-friction bearing surrounding the stub axle, the aforesaid bearing-apertures in the stub axle opening to said bearing, a wheel hub mounted on the bearing, and a cap nut carried by the outer end of the stub axle and engageable with the bearing.

In testimony whereof I affix my signature.

FRANKWILL VON ELBERTZ.